(12) United States Patent
Ellinghuysen

(10) Patent No.: US 9,867,512 B1
(45) Date of Patent: Jan. 16, 2018

(54) SELF-CONTAINED PORTABLE TOILET

(71) Applicant: Mark Ellinghuysen, Winona, MN (US)

(72) Inventor: Mark Ellinghuysen, Winona, MN (US)

( * ) Notice: Subject to any disclaimer, the term of this patent is extended or adjusted under 35 U.S.C. 154(b) by 0 days.

(21) Appl. No.: 15/227,736

(22) Filed: Aug. 3, 2016

(51) Int. Cl.
*A47K 11/02* (2006.01)
*A47K 13/00* (2006.01)

(52) U.S. Cl.
CPC ............ *A47K 11/02* (2013.01); *A47K 13/005* (2013.01)

(58) Field of Classification Search
CPC ....... A47K 11/02; A47K 11/04; A47K 13/005
USPC ..................... 4/312, 460, 476, 483
See application file for complete search history.

(56) References Cited

U.S. PATENT DOCUMENTS

| | | | | |
|---|---|---|---|---|
| 804,019 A * | 11/1905 | Lotz | ........................ | A47K 11/04 297/411.34 |
| 2,495,374 A * | 1/1950 | Horn | ....................... | A47B 79/00 182/28 |
| 3,600,719 A | 8/1971 | Karr | | |
| 3,693,193 A * | 9/1972 | May | ..................... | A47K 11/026 141/114 |
| 3,723,999 A * | 4/1973 | Miller | .................. | A47K 11/026 4/484 |
| 4,751,753 A * | 6/1988 | Sargent | ..................... | E03D 7/00 4/300.1 |
| 5,048,130 A | 9/1991 | Brotman et al. | | |
| D323,881 S * | 2/1992 | Franey | .......................... | D23/299 |
| 6,081,943 A * | 7/2000 | Garcete | .................. | A47K 11/02 4/476 |
| 8,510,877 B2 | 8/2013 | Helewa | | |
| 9,113,756 B2 * | 8/2015 | Shaw | ..................... | A47K 11/02 |
| 9,289,101 B2 * | 3/2016 | Weir | ...................... | A47K 11/04 |

* cited by examiner

*Primary Examiner* — Paul R Durand
*Assistant Examiner* — William R Klotz
(74) *Attorney, Agent, or Firm* — Stevenson IP, LLC

(57) ABSTRACT

A self-contained portable toilet includes a hollow, parallelepiped base. Attached to the base is a collapsible support stand and a top cover. The base has a cutout through which an access door is disposed. An aperture and a bar allow a roll of toilet paper to be disposed in the base. A toilet paper cover protects the toilet paper. A top cover is hingedly disposed on a top side of the base and has an open position and a stored position. When the top cover is in the open position, a removable toilet seat can be placed on the top side of the base and an interior lip of the top cover. A storage slot houses the removable toilet seat. A handle allows for transport of the self-contained portable toilet. A rubber strap locks the top cover in the stored position.

4 Claims, 5 Drawing Sheets

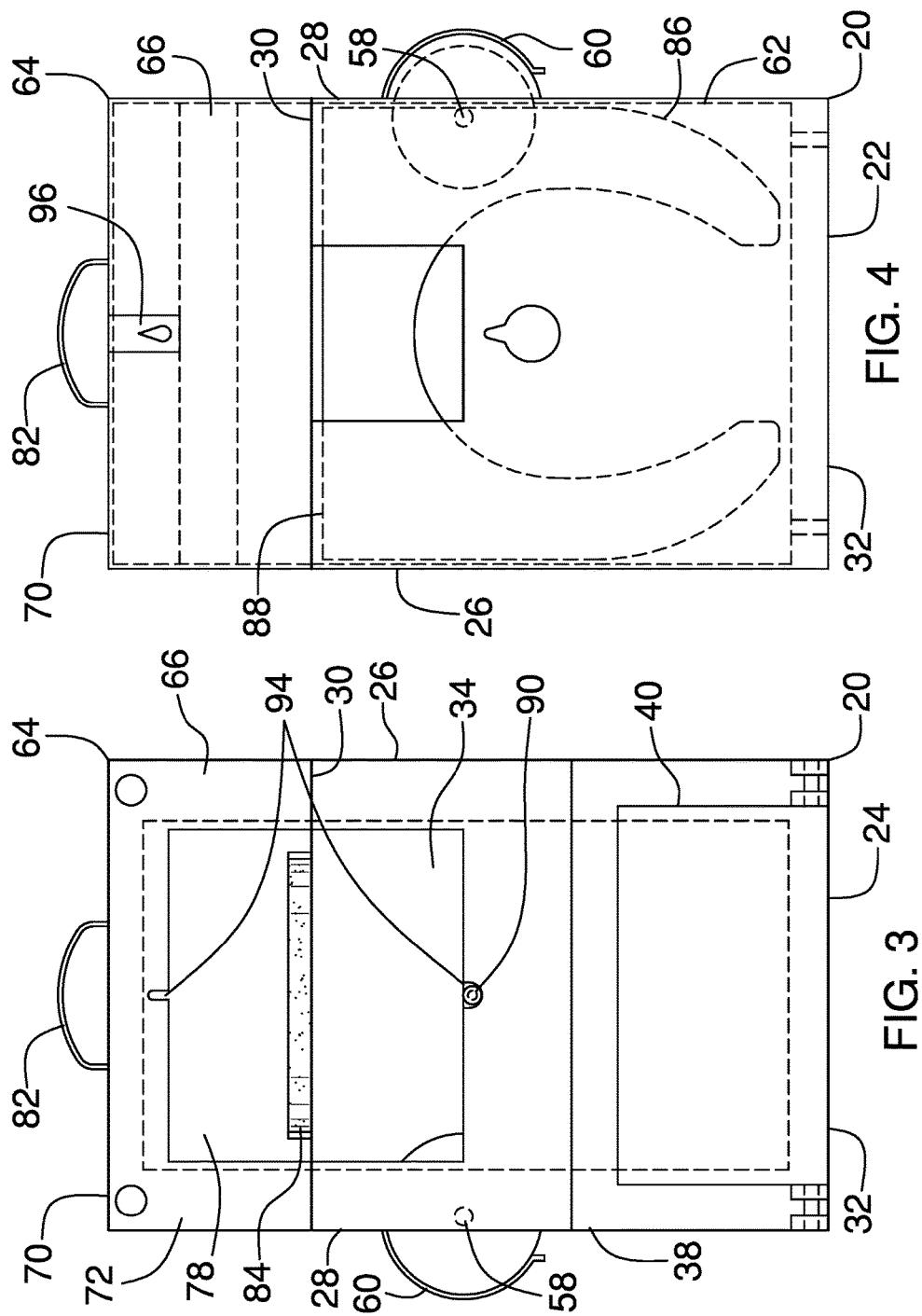

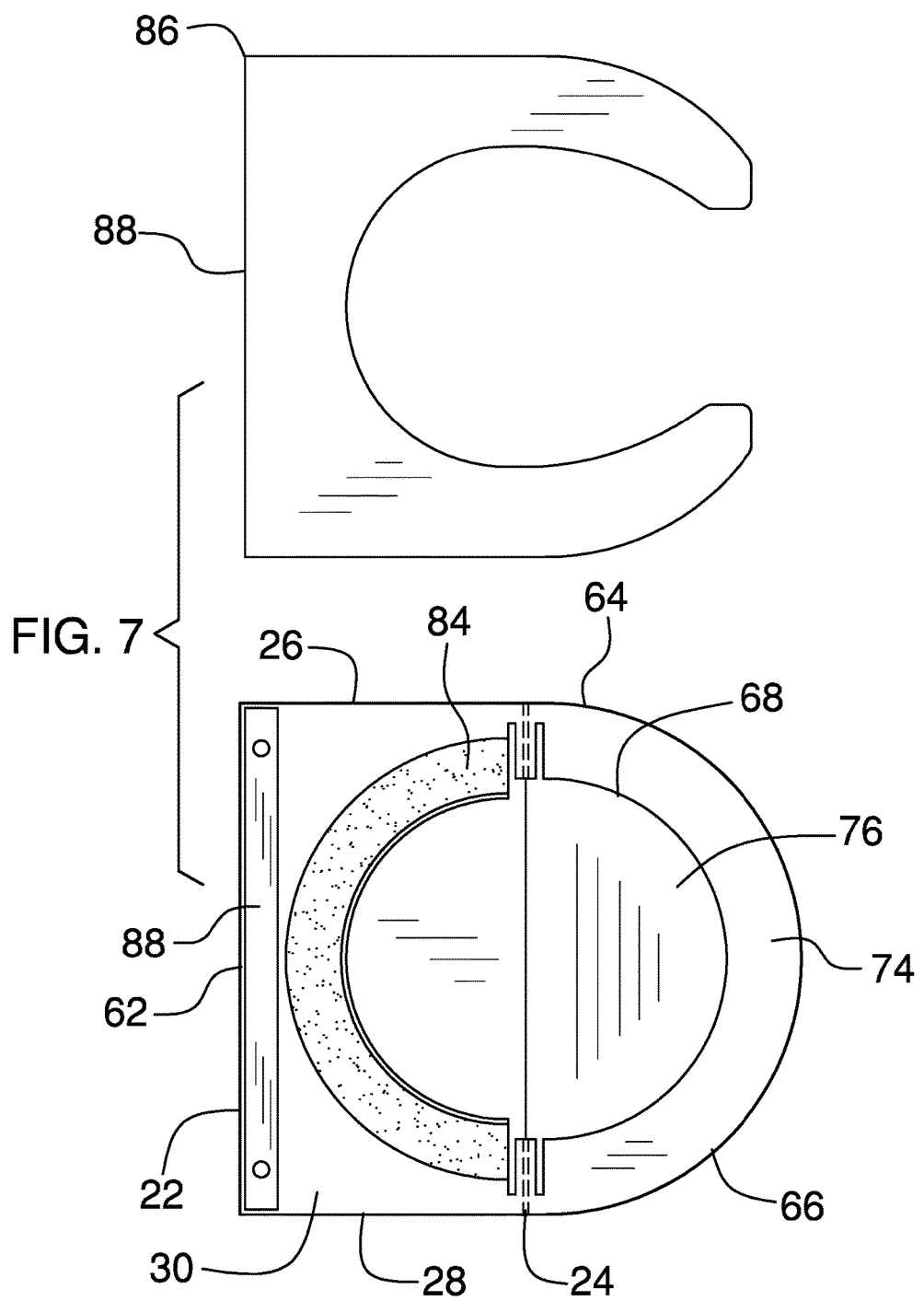

SELF-CONTAINED PORTABLE TOILET

BACKGROUND OF THE INVENTION

Various types of portable toilets are known in the prior art. However, what is needed and what the present device provides is a self-contained portable toilet including a hollow base, a foldable top cover which can be placed atop the base or extended outwardly, an access door disposed through the base and the top cover for cleaning the base, a collapsible support stand, and a storage slot for housing a removable toilet seat. The present device can also be used on a hunting tree stand.

FIELD OF THE INVENTION

The present invention relates to portable toilets, and more particularly, to a self-contained portable toilet which has unique features allowing easy transportation of the portable toilet, including a top cover which can be in either a stored position or an in-use position, a support stand which can collapse, and a handle.

SUMMARY OF THE INVENTION

The general purpose of the present self-contained portable toilet, described subsequently in greater detail, is to provide a self-contained portable toilet which has many novel features that result in a self-contained portable toilet which is not anticipated, rendered obvious, suggested, or even implied by prior art, either alone or in combination thereof.

To accomplish this, the present self-contained portable toilet includes a hollow base which has a rear side with a cutout centrally disposed thereon, a front side, a left side, a right side, a top side, and a bottom side. A hemispherical top cover is hingedly disposed on the top side. The top cover has a posterior wall with an exterior slot centrally disposed thereon. An access door is disposed both within the cutout and the exterior slot, giving the user access to clean the self-contained portable toilet and also to reduce odor emanating from the base. A knob on the access door allows the user to slide the door. Knob notches in the posterior wall and the rear side are devised to hold the knob in place. The top cover can be stored while not in use. A handle on an upper wall of the top cover allows the user to carry the device during transport. A collapsible support stand is hingedly disposed on the base and is devised to provide extra support while in use by the user.

An aperture, a bar, and a toilet paper cover are disposed on one of the sides of the base and provide a location for toilet paper to be stored. A storage slot is provided to easily store a removable toilet seat. A rubber seal is disposed on the top cover and prevents the forward sliding of the removable toilet seat. A pair of rubber pads is disposed on the posterior wall of the top cover and provides a cushion between the top cover and the base. A rubber strap is provided to lock the top cover in place.

Thus has been broadly outlined the more important features of the present self-contained portable toilet so that the detailed description thereof that follows may be better understood and in order that the present contribution to the art may be better appreciated.

BRIEF DESCRIPTION OF THE DRAWINGS

Figures

FIG. 3 is a rear elevation view.

FIG. 4 is a front elevation view.

FIG. 7 is a top plan view with the top cover in the open condition.

DETAILED DESCRIPTION OF THE DRAWINGS

Figure 1:
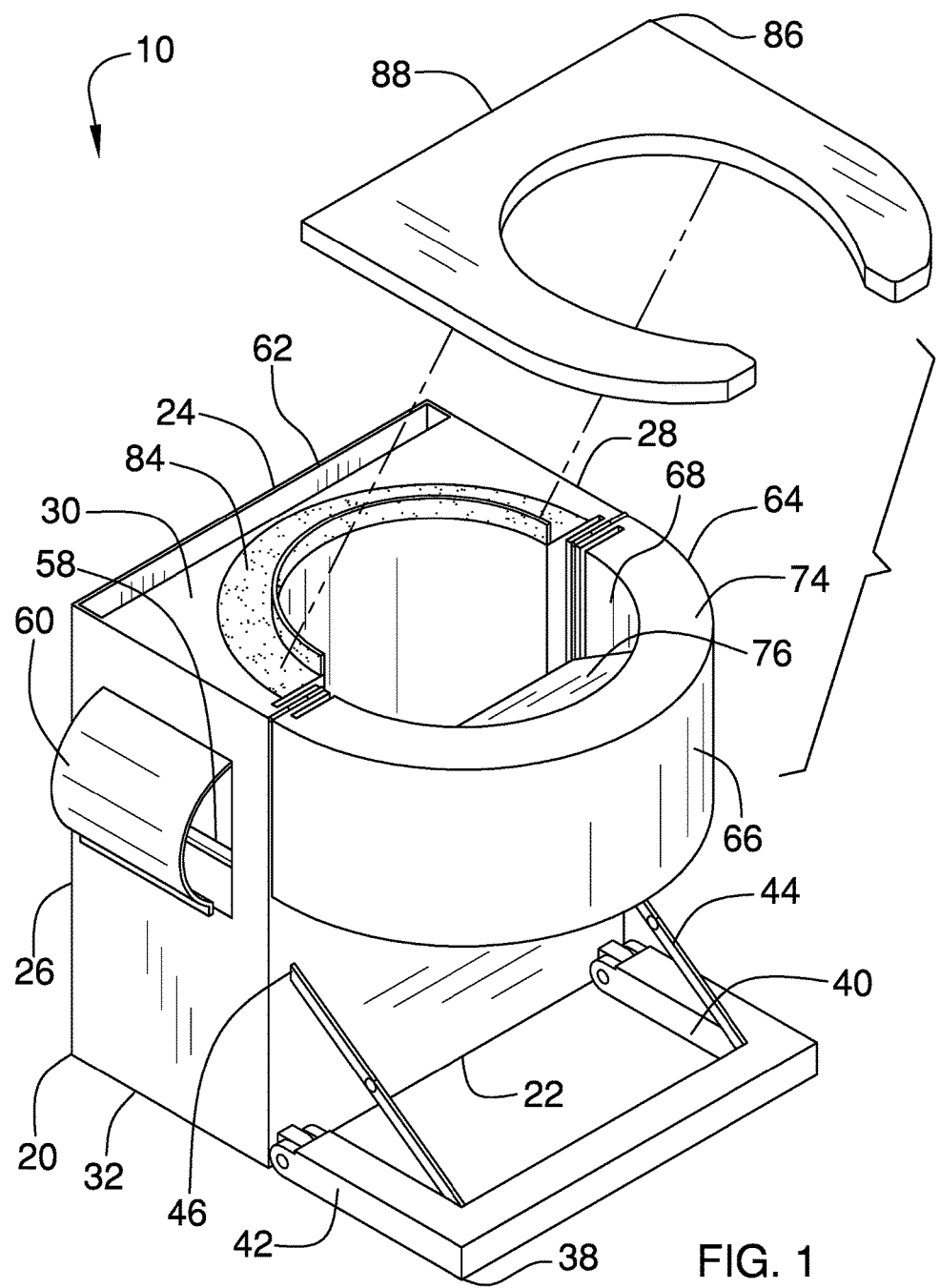
FIG. 1 is an exploded front isometric view with a top cover in an open condition.
Figure 2:
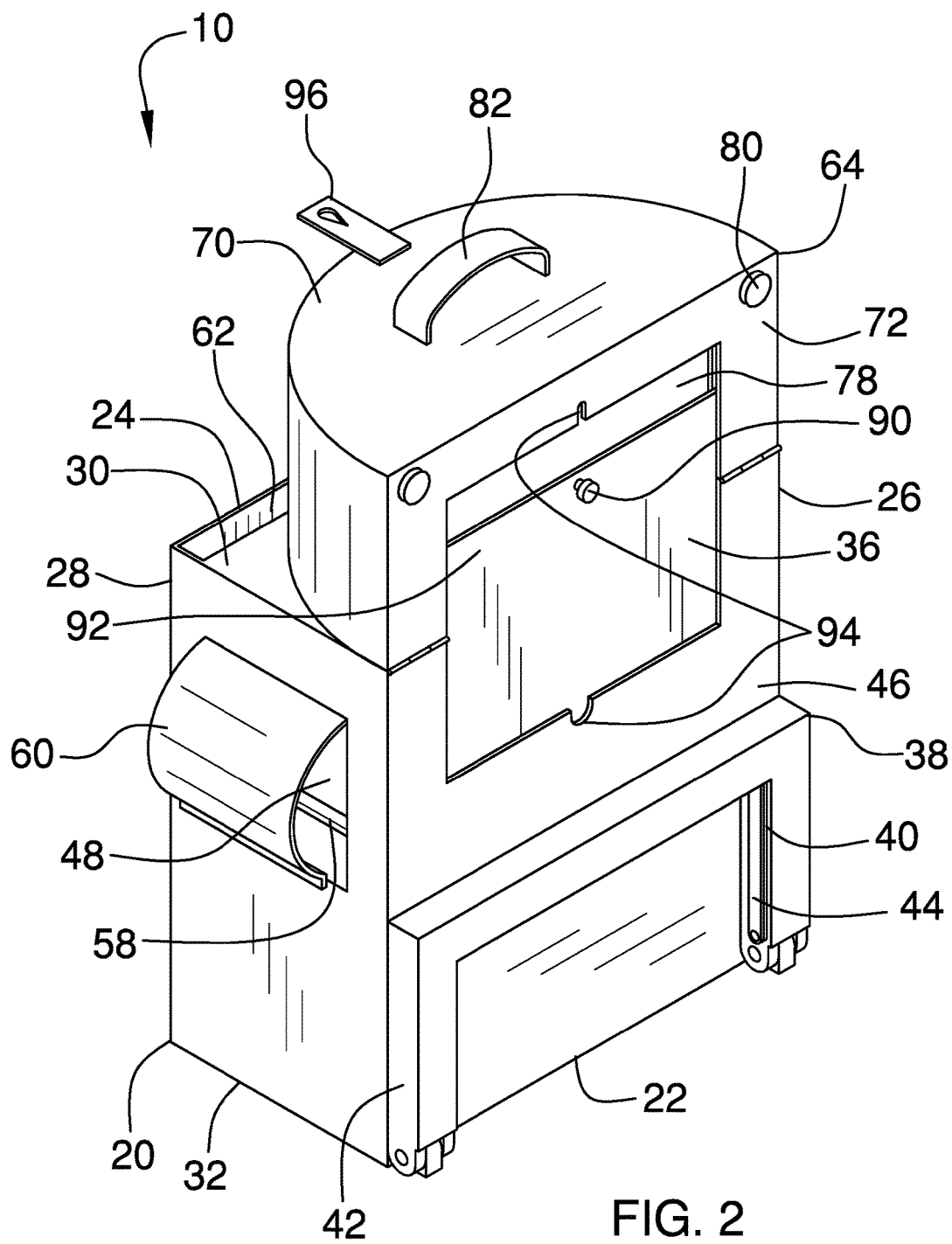
FIG. 2 is a rear isometric view with the top cover in a stored condition.
Figure 6:
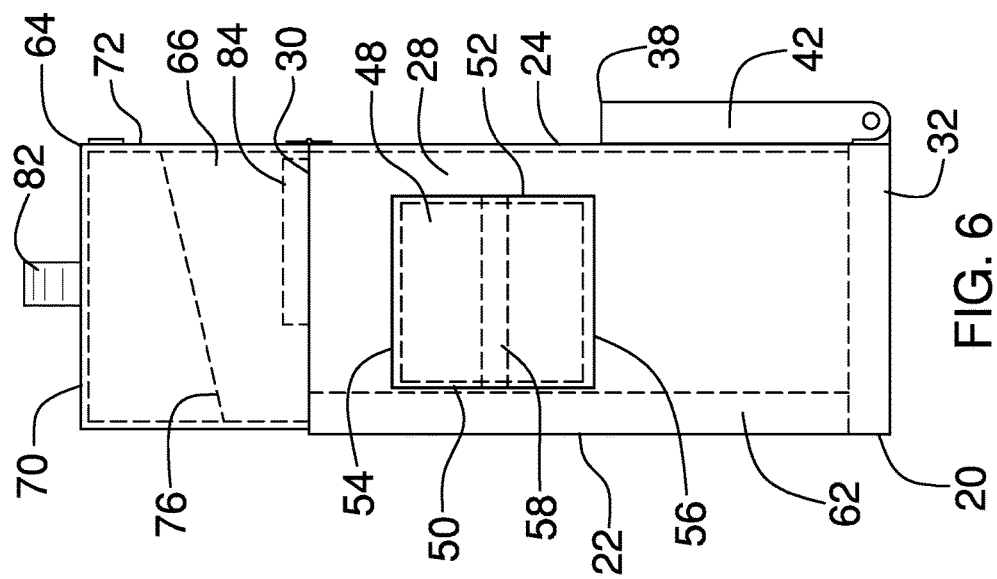
FIG. 6 is a right side elevation view with the top cover in the close condition.
Figure 5:
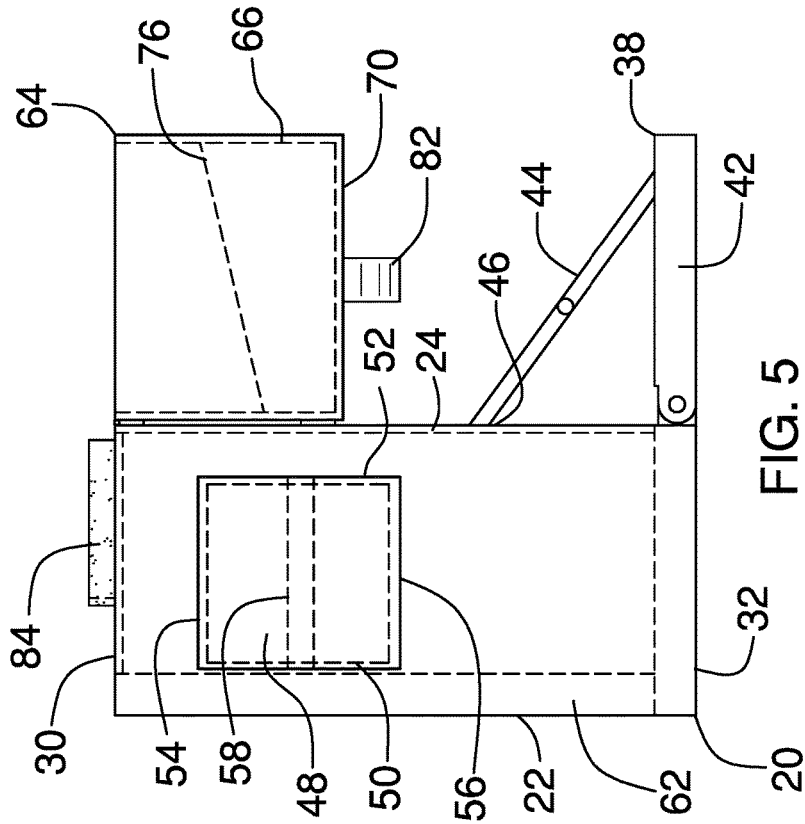
FIG. 5 is a right side elevation view with the top cover in the open condition.

With reference now to the drawings, and in particular FIGS. 1 through 7 thereof, an example of the instant self-contained portable toilet employing the principles and concepts of the present self-contained portable toilet and generally designated by the reference number 10 will be described.

Referring to FIGS. 1 through 7 the present self-contained portable toilet 10 is illustrated. The self-contained portable toilet 10 includes a hollow parallelepiped base 20 having a front side 22, a rear side 24, a left side 26, a right side 28, a top side 30, and a bottom side 32. A cutout 34 is centrally disposed on the rear side. An access door 36 is disposed within the cutout 34. A collapsible support stand 38 is hingedly disposed on the rear side 24 proximal the bottom side 32. The support stand 38 has an interior edge 40 and an exterior edge 42. A pair of foldable legs 44 is attached to the interior edge 40 and a central position 46 on the rear side 24.

At least one rectangular aperture 48 is centrally disposed on one of the right side 28 and the left side 26 proximal the top side 30. The at least one rectangular aperture 48 has a forward edge 50, a rearward edge 52, an upper edge 54, and a lower edge 56. A bar 58 is removably and centrally disposed within the aperture 48 and extends from the rearward edge 52 to the forward edge 50. At least one flexible semicircular toilet paper cover 60 is disposed directly over the at least one aperture 48. A parallelepiped storage slot 62 is centrally disposed proximal the front side 22 and extends from the top side 30 to the bottom side 32.

A hemispherical top cover 64 is hingedly disposed on the top side 30 of the base 20 proximal the rear side 24. The top cover 64 has a convex exterior wall 66, a convex interior wall 68, a flat upper wall 70, flat posterior wall 72. A curved interior lip 74 is disposed between the exterior wall 66 and the interior wall 68. The top cover 64 has an angled surface 76 extending from the interior wall 68 proximal the upper wall 70 to the interior wall 68 proximal the lip 74. The top cover 64 has a stored position and an alternate in-use position. When the top cover 64 is in the stored position, the lip 74 is in contact with the top side 30 of the base 20, and alternately when the top cover 64 is in the in-use position, the posterior wall 72 is in contact with the rear side 24 of the base 20 and the lip 74 is coplanar with the top side 30.

A rectangular exterior slot 78 is centrally disposed on the posterior wall 72 and alignable with the cutout 34. The access door 36 is disposed within the cutout 34 and the exterior slot 78. The access door 36 has an open position and an alternate closed position. A pair of rubber pads 80 is disposed on the posterior wall 72 proximal the upper wall 70. A handle 82 is centrally disposed on the upper wall 70. A semicircular rubber seal 84 is centrally disposed on the top side 30 and is alignable with the interior wall 68 when the top cover 64 is in the stored position.

A removable toilet seat 86 can be disposed on the top side 30 and the lip 74 when the top cover 64 is in the in-use position. A rear portion 88 of the toilet seat 86 is disposed between the rubber seal 84 and the rear side 24.

A knob 90 is disposed on an upper portion 92 of the access door 36. A plurality of knob notches 94 is centrally disposed on both the cutout 34 and the exterior slot 78. The knob 90 is engageable to the knob notches 94. A rubber strap is 96 centrally disposed on the upper wall 70 proximal the exterior wall 66.

What is claimed is:

1. A self-contained portable toilet comprising:
    a hollow parallelepiped base having a front side, a rear side, a left side, a right side, a top side, and a bottom side;
    a cutout centrally disposed on the rear side;
    an access door disposed within the cutout;
    a collapsible support stand hingedly disposed on the rear side proximal the bottom side, the support stand having an interior edge and an exterior edge, the support stand being attached to the base by a pair of foldable legs, wherein the foldable legs are attached to the interior edge and a central position on the rear side;
    at least one rectangular aperture centrally disposed on one of the right side and the left side proximal the top side, the at least one rectangular aperture having a forward edge, a rearward edge, an upper edge, and a lower edge;
    a bar removably and centrally disposed within the aperture, the bar extending from the rearward edge to the forward edge;
    at least one flexible semicircular toilet paper cover, the at least one toilet paper cover disposed directly over the at least one aperture;
    a parallelepiped storage slot centrally disposed proximal the front side extending from the top side to the bottom side;
    a hemispherical top cover hingedly disposed on the top side of the base proximal the rear side, the top cover having a convex exterior wall, a convex interior wall, a flat upper wall, flat posterior wall, and a curved interior lip disposed between the exterior wall and the interior wall, the top cover having an angled surface extending from the interior wall proximal the upper wall to the interior wall proximal the lip, the top cover having a stored position and an alternate in-use position, wherein when the top cover is in the stored position, the lip is in contact with the top side of the base, and alternately when the top cover is in the in-use position, the posterior wall is in contact with the rear side of the base and the lip is coplanar with the top side;
    a rectangular exterior slot centrally disposed on the posterior wall and alignable with the cutout, wherein the access door is disposed within both the cutout and the exterior slot, the access door having an open position and an alternate closed position;
    a pair of rubber pads disposed on the posterior wall proximal the upper wall; and
    a handle centrally disposed on the upper wall.

2. The self-contained portable toilet of claim 1 further comprising:
    a semicircular rubber seal centrally disposed on the top side, the rubber seal being alignable with the interior wall when the top cover is in the stored position;
    a removable toilet seat disposed on the top side and the lip when the top cover is in the in-use position, wherein a rear portion of the toilet seat is disposed between the rubber seal and the rear side;
    a knob disposed on an upper portion of the access door; and
    a plurality of knob notches centrally disposed on both the cutout and the exterior slot, wherein the knob is engageable to the knob notches.

3. The self-contained portable toilet of claim 1 further comprising:
    a rubber strap centrally disposed on the upper wall proximal the exterior wall.

4. A self-contained portable toilet comprising:
    a hollow parallelepiped base having a front side, a rear side, a left side, a right side, a top side, and a bottom side;
    a cutout centrally disposed on the rear side;
    an access door disposed within the cutout;
    a collapsible support stand hingedly disposed on the rear side proximal the bottom side, the support stand having an interior edge and an exterior edge, the support stand being attached to the base by a pair of foldable legs, wherein the foldable legs are attached to the interior edge and a central position on the rear side;
    at least one rectangular aperture centrally disposed on one of the right side and the left side proximal the top side, the at least one rectangular aperture having a forward edge, a rearward edge, an upper edge, and a lower edge;
    a bar removably and centrally disposed within the aperture, the bar extending from the rearward edge to the forward edge;
    at least one flexible semicircular toilet paper cover, the at least one toilet paper cover disposed directly over the at least one aperture;
    a parallelepiped storage slot centrally disposed proximal the front side extending from the top side to the bottom side;
    a hemispherical top cover hingedly disposed on the top side of the base proximal the rear side, the top cover having a convex exterior wall, a convex interior wall, a flat upper wall, flat posterior wall, and a curved interior lip disposed between the exterior wall and the interior wall, the top cover having an angled surface extending from the interior wall proximal the upper wall to the interior wall proximal the lip, the top cover having a stored position and an alternate in-use position, wherein when the top cover is in the stored position, the lip is in contact with the top side of the base, and alternately when the top cover is in the in-use position, the posterior wall is in contact with the rear side of the base and the lip is coplanar with the top side;
    a rectangular exterior slot centrally disposed on the posterior wall and alignable with the cutout, wherein the access door is disposed within both the cutout and the exterior slot, the access door having an open position and an alternate closed position;
    a pair of rubber pads disposed on the posterior wall proximal the upper wall;
    a handle centrally disposed on the upper wall;
    a semicircular rubber seal centrally disposed on the top side, the rubber seal being alignable with the interior wall when the top cover is in the stored position;
    a removable toilet seat disposed on the top side and the lip when the top cover is in the in-use position, wherein a rear portion of the toilet seat is disposed between the rubber seal and the rear side;
    a knob disposed on an upper portion of the access door;
    a plurality of knob notches centrally disposed on both the cutout and the slot, wherein the knob is engageable to the knob notches; and a rubber strap centrally disposed on the upper wall proximal the exterior wall.

* * * * *